April 22, 1958 E. B. BLOCK 2,831,923
INDUCTION PICKUP AND TRANSMISSION SYSTEM
Filed April 22, 1954
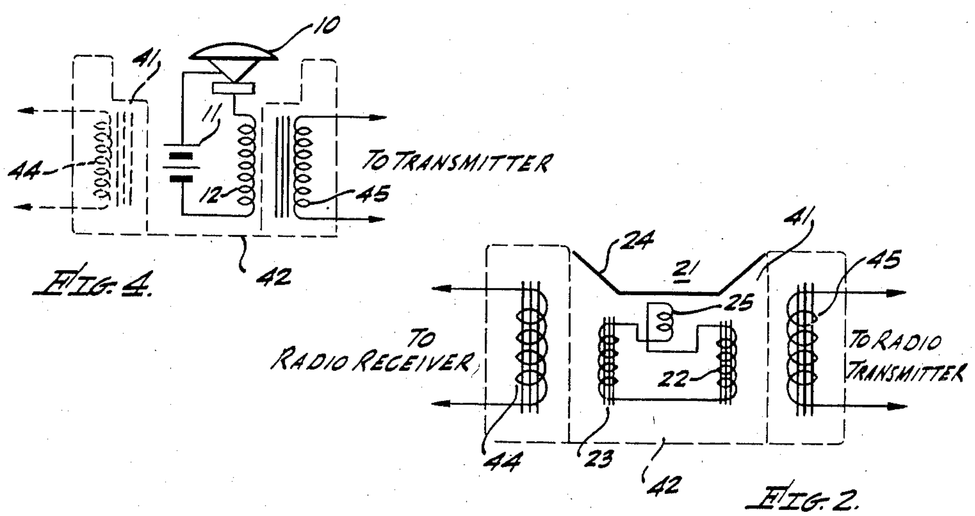
FIG. 4 FIG. 2
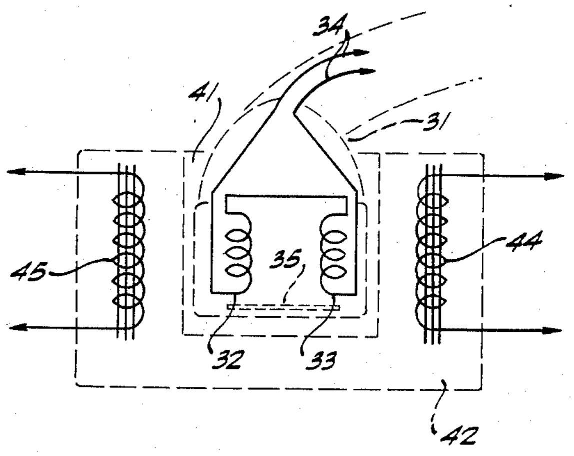
FIG. 3
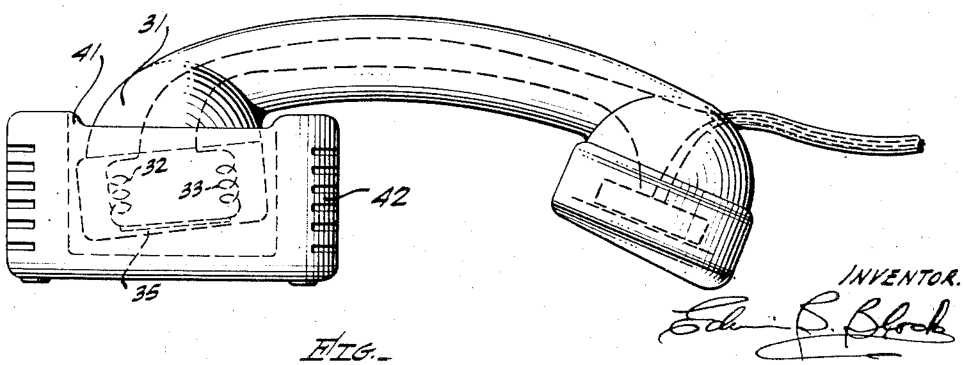
FIG.
INVENTOR.
Edwin B. Block United States Patent Office 2,831,923 Patented Apr. 22, 1958

2,831,923

INDUCTION PICKUP AND TRANSMISSION SYSTEM

Edwin B. Block, Canoga Park, Calif.

Application April 22, 1954, Serial No. 424,831

6 Claims. (Cl. 179—1)

My invention relates to induction devices and in particular to an induction unit having multi-purpose utility in radio-telephone communications applications.

A great number of amateur operators of radio communications transmitting stations have frequent occasion, particularly in emergencies, to attempt to couple telephone land lines with their radio receiving and transmitting apparatus. By so doing they are able to transmit intelligence from the telephone receiver with their transmitters and intelligence picked up on their receivers into the telephone line thereby providing two-way communication between the local telephone party and the radio party at some remote distance. At present when it is necessary to engage in emergency communication of this type there is need for direct connection to the telephone line, a practise frowned upon by the common carrier operating the telephone lines, or the use of complex induction systems for the inter-communication coupling.

It is possible with the device contemplated by my invention to provide both the inter-communication coupling between the telephone land lines and an amateur radio (or other) transmitting and receiving station and other uses in connection with transmitter-receiver operation.

Accordingly, it is an object of my invention to provide an induction coupling device for inductively intercoupling radio receiving apparatus, radio transmitting apparatus and telephone land lines for the two-way communication of intelligence therebetween.

It is a further object of my invention to provide an inductive means for intercoupling a speaker microphone between the radio receiver and radio transmitting apparatus of a radio communication station so that the speaker microphone may act in its dual capacity without the requirement of switching.

It is a still further object of my invention to provide an induction device to act as an induction pickup for any device capable of translating intelligence into varying magnetic field, energy of which may be induced in the said induction pickup.

And it is yet another object of my invention to provide an induction pickup means whereby the intelligence energy in the form of magnetic leakage currents from telephone instruments may be picked up and recorded and simultaneously transmitted in another communication or transmission system.

It is a still further object of my invention to provide an induction pickup means whereby both ends of a telephone communication, or telephone-radio communication may be applied to recording systems without direct electrical connection to the recording system.

The novel features of my invention will become clear from the foregoing discussion, the detailed description of the figures which follows, and the appended claims, the organization of the invention and its operation, along with further objects and advantages of its use, will be further understood by referring to the following description in connection with the accompanying drawings in which:

Fig. 1 is an external view of the placement of a telephone handset when used in conjunction with an assembly incorporating the induction pickup and transmission system of my invention;

Fig. 2 is a diagram of the induction pickup and transmission device of my invention showing one of its uses in connection with a speaker-microphone;

Fig. 3 is a diagram of the induction pickup and transmission device of my invention showing its use in connection with the receiver side of a telephone hand set; and Fig. 4 is a diagram of the induction pickup and transmission device of my invention showing one of its uses in connection with a carbon microphone device.

Reference is now made to the figures, which, in the following description, are considered jointly and severally, and in which like parts bear identical reference characters.

Referring now to Fig. 1 there is shown a telephone handset 43 when its receiver 31 is placed within an opening 41 of an induction unit 42 of this invention. Induction unit 42 is a box which may have a rectangular or circular cross-section. The top of box 42 has cut out of its surface a circular opening 41 of a size sufficient in dimensions to receive in the opening thereby provided the receiver section 31 of the handset 43. Receiver 31 is the conventional receiver of a telephone handset such as illustrated in Fig. 1, and incorporates a coil of the balanced type shown at 32 and 33 or other type and a diaphragm as shown at 35. The dashed lines going through the handle portion of the handset represent the internally connected wires of the telephone system incorporated in the handset.

Fig. 2 shows a dynamic transducer 21 connected with a dual inductor having a driving coil 22 and a driven coil 23. This assembly, too, is arranged for insertion into the receptacle opening 41 of the induction unit 42 of this invention shown in Fig. 4.

Fig. 3 shows the electrical circuitry of a telephone receiver 31 including the receiver coils 32 and 33, previously described, as they may appear in the opening 41 of the induction unit 42 of this invention.

Fig. 4 shows an arrangement of a carbon microphone 10, battery 11 and an iron-core inductor 12 connected in series, with the inductor and battery-microphone assembly arranged for insertion in the receptacle opening 41 of the induction pickup and transmission unit 42 of this invention as shown in Fig. 1.

The primary purpose of my invention is the provision of a dual induction pickup and transmission means as shown at 42 in the several figures. Within the pickup and transmission means 42 an input coil 44 and an output coil 45 are placed. Input coil 44 normally has an impedance designed to match the output circuit of a radio receiver or an audio amplifier such as may be incorporated in a sound recording instrument so that energy derived from the said output circuit which is induced in the coil 44 results in magnetic leakage currents about the coil 44. These leakage currents may be impressed on any other coil of suitable construction placed in proximity to coil 44. In the examplees described above the magnetic leakage energy from coil 44 induces magnetic fields in the coil 22 (Fig. 2) corresponding to variations in the said fields. These variations result in the excitation of the voice coil 25 to vibrate diaphragm 24 of transducer 21. Where the magnetic leakage field induced current variations correspond to intelligence, the transducer 21 produces sound corresponding to this intelligence.

In the example shown in Fig. 3, the coils 32 and 33 of telephone receiver 31 are positioned in the pickup and transmission unit 42 so as to be in proximity to coil 44. Signal energy from a radio receiver, or other source of intelligence transmission in the form of a varying electrical current, will be induced in the coils 32 and 33 of the telephone receiver and the resultant varying electrical current corresponding to the signal energy is transmitted over to telephone lines 34.

A converse state of affairs exists in the use of the induction pickup and transmission device 42 to transmit intelligence from the telephone instrument 31 into some other instrument such as a radio transmitter or a sound recording instrument. Speech sounds constituting the intelligence on the telephone lines 34 have been converted to electrical impulses on these lines. The electrical impulses, as they are impressed on receiver 31 from the lines 34, pass through coils 32 and 33 of the receiver 31. In the normal use of the telephone one would listen to the sound variations resulting from these electrical impulses causing the vibration of diaphragm 35 in the telephone receiver 31. The impulses in coils 32 and 33 result in magnetic leakage fields in the immediate area surrounding the coils 32 and 33. Therefore, any other coil of suitable construction such as 45 which is in the proximate area surrounding the coils 32 and 33 will have turns of wire that may be crossed by these magnetic leakage fields to induce in the said other coil such as 45 an electric current corresponding to the intelligence currents being impressed on the telephone receiver. The impedance of coil 45 would be normally of such a value as to match the input circuits of a speech amplifier in a transmitter or any audio amplifier input such as that of a sound recording instrument to which it is desired to couple the coil 45.

Referring now to Fig. 1 the overall general arrangement of the induction pickup and transmission device may be seen. While the structure illustrated is a convenient one, any other construction suitable to accomplish the purposes set forth herein may be employed. The purposes are to either receive signal energy by induction from some source of signals external to the device of this invention or conversely to transmit signals by induction from the device of this invention into some external receiving system for the induced signals. Examples of this are shown specifically in Fig. 2 and Fig. 4:

The induction output coil 12, shown in Fig. 4, is energized by the current variations created by the operation of carbon microphone 10 in response to speech. These current variations result in magnetic leakage fields which as has been previously described induce an electrical current in coil 45.

In Fig. 2 the transducer 21 may be employed as a microphone. In response to speech vibrations of the atmosphere the diaphragm 24 of transducer 21 is excited to move voice coil 25 within the fixed magnetic field provided for it. This results in currents in the voice coil 25 corresponding to the speech. These currents appear in coil 23 by virtue of the series connection thereof with voice coil 25 to produce magnetic leakage fields which are induced in coil 45 as has been previously described.

In the application of either Fig. 2 or Fig. 4, the system is employed as a microphone when used as just described.

Transducer 21 acts both as a microphone and as a loudspeaker when used as has been described above. The energy generated by the voice coil 25 of transducer 21 when it is being excited as a microphone is induced in coil 45 through the action of inductor coil 23. The output of coil 45 is then applied to the speech input circuit of a radio broadcast transmitter modulator or to the input of an audio amplifier such as may be used in sound recording instruments. Wire or magnetic tape recorders or dictating machines are examples of such instruments. As a loudspeaker, transducer 21 is energized by energy induced in coil 22 from coil 44. Coil 44 may be connected with an audio output circuit that may be a part of a radio receiver, an audio amplifier circuit, the output of a sound recording and reproducing system, or any other source of signals that may be electrically transduced by the techniques described herein.

I have shown above means and methods by which a plurality of induction coils may be employed in a suitable receptacle to provide pickup and transmission of induced electrical currents corresponding to intelligence and sounds in microphone devices, telephone devices and other electrical transducing devices. The intelligence so picked up may either be transmitted over other intelligence transmission means or utilized in connection with receiving apparatus. Although I have shown several preferred applications and embodiments of my invention it is to be understood other uses may be made of my invention by those skilled in the art without departing from the spirit or intent thereof.

What I claim as new is:

1. An induction pickup and transmission system for electrical signals comprising: a first induction coil connected to an external signal source; a second induction coil connected to an external signal amplifier; and a receptacle having a circular cutout in the top surface thereof defining an opening therein for receiving an electroacoustic transducer, said first and said second induction coils being disposed within said receptacle in an inductive relation to the electroacoustic transducer when placed in said opening to provide for two-way induction of signals from said source into the electroacoustic transducer from said first induction coil and from the electroacoustic transducer into said second induction coil and thereby into said external signal amplifier.

2. An induction pickup and transmission device for two-way operation with an electroacoustic transducer comprising: a first means connected to a source of signals for receiving an electrical signal by magnetic induction; a second means connected to an external amplifier for transmitting an electrical signal by magnetic induction; and a receptacle having a single circular cutout in the top surface thereof defining an opening therein to receive an electroacoustic transducer, and to house said first and said second means disposed within said receptacle in an inductive relation to said electroacoustic transducer when placed in said opening whereby signals from said first means are induced in said transducer and signals from said transducer are induced in said second means.

3. An induction signal pickup and transmission device for bi-directional operation with an electroacoustic translator comprising: a receptacle having a single circular cutout in the top surface thereof defining an opening therein through which to insert said translator into said receptacle; and a pair of induction coils disposed within said receptacle opposite one another across said opening to be in an inductive relation to said translator when placed in said opening whereby separate signals are picked up by one of said coils from said translator and other signals are induced in said translator from the other of said coils.

4. An induction pickup and transmission device for telephones comprising: a receptacle having a circular cutout defining an opening in the top surface thereof; adapted to receive the receiver end of a telephone handset; a first induction coil, said first induction coil being connected to an external amplifying means and disposed within said receptacle in such proximate relationship to said telephone receiver as to permit induction of signals from said telephone receiver into said first coil for transmission by said first induction coil to said external amplifying means; and a second induction coil, said second induction coil being connected to an external signal source and disposed within said receptacle in such proximate relationship to said telephone receiver as to permit induction of signals from said external signal source into said telephone receiver.

5. The device defined in claim 2 wherein said transducer is a part of the system and comprises a loudspeaker element having electrical coils connected to a source of driving signals, said coils being substantially fixed within said opening of said receptacle and positioned therein in inductive relation to said first and second means to induce the driving signals in said second means, the signals in said first means being induced in said coils to excite said loudspeaker element.

6. The device defined in claim 2 wherein said transducer is a part of the system and comprises a carbon microphone, an induction coil and a battery connected in series, and disposed in said opening within said receptacle so that said induction coil is in inductive proximity to said second means whereby, when said microphone is excited by sound, signals corresponding to said sound are introduced in said second means and amplified by said external amplifier.

References Cited in the file of this patent

UNITED STATES PATENTS

| | | |
|---|---|---|
| 2,268,665 | Loewe | Jan. 6, 1942 |
| 2,632,811 | Souget et al. | Mar. 24, 1953 |